Nov. 7, 1944.　　　　W. A. TULLOCH　　　　2,362,177
AUTOMATIC LOADING APPARATUS FOR MACHINE TOOLS
Filed April 10, 1944　　　4 Sheets-Sheet 1
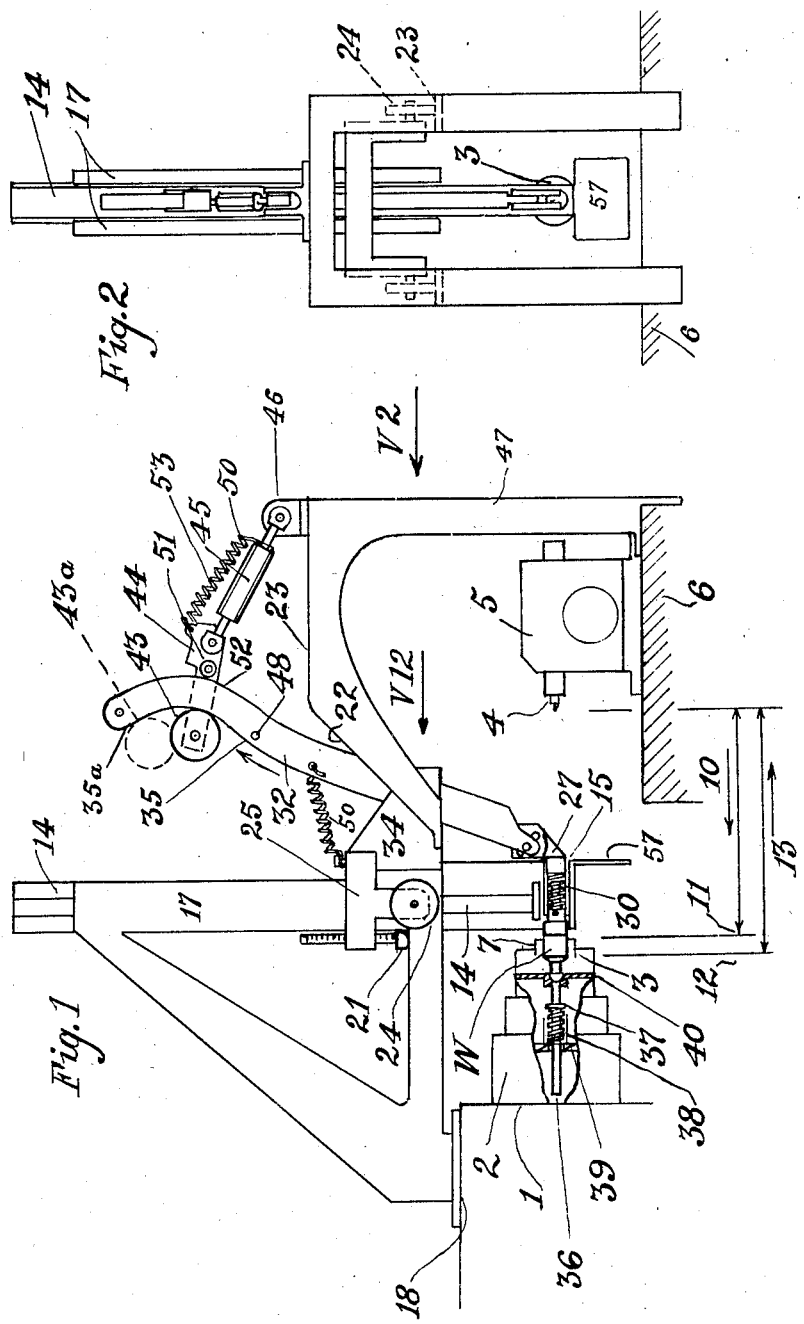
INVENTOR
WILLIAM A. TULLOCH.
BY
ATTORNEY

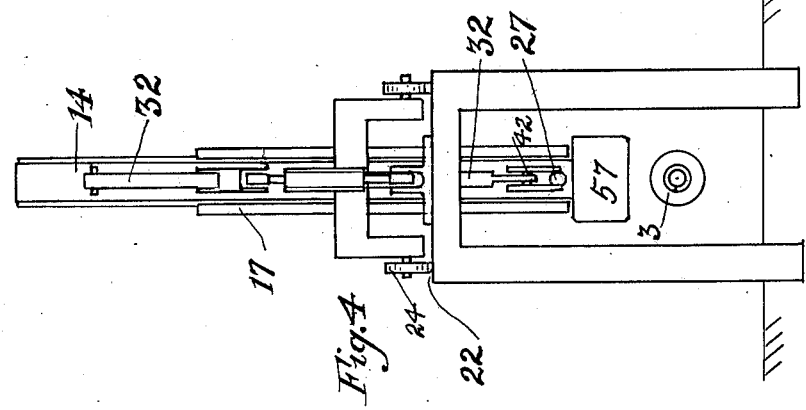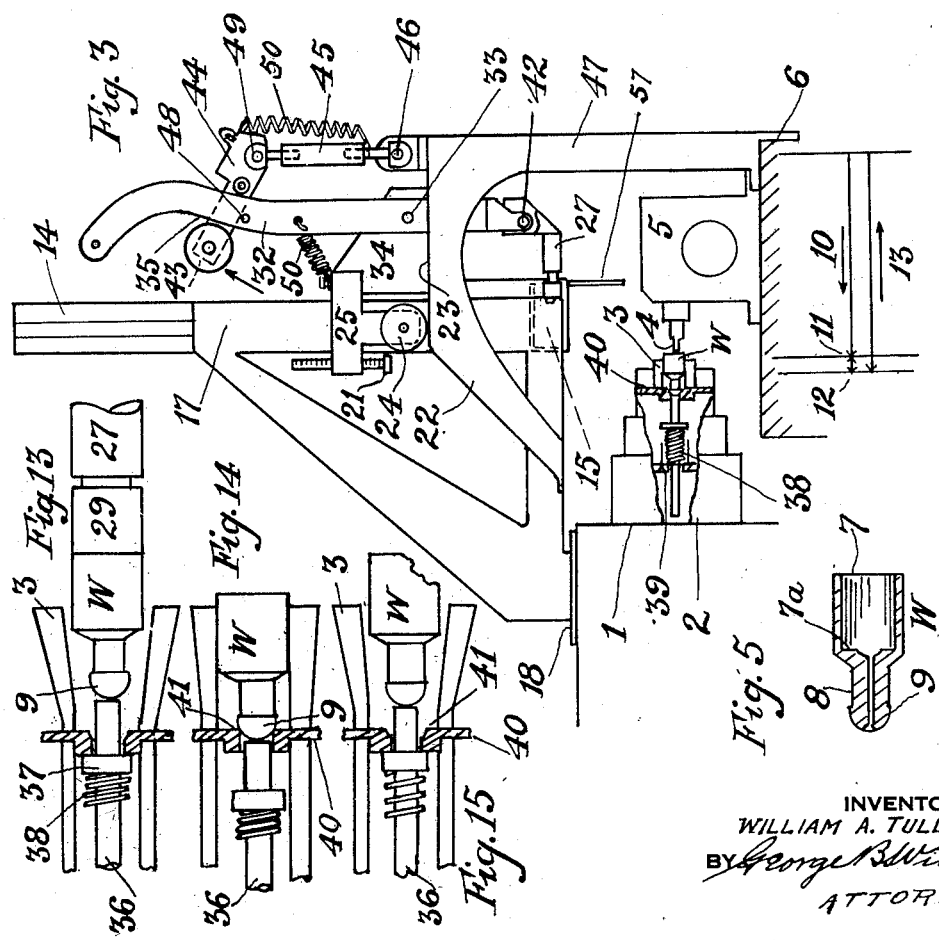

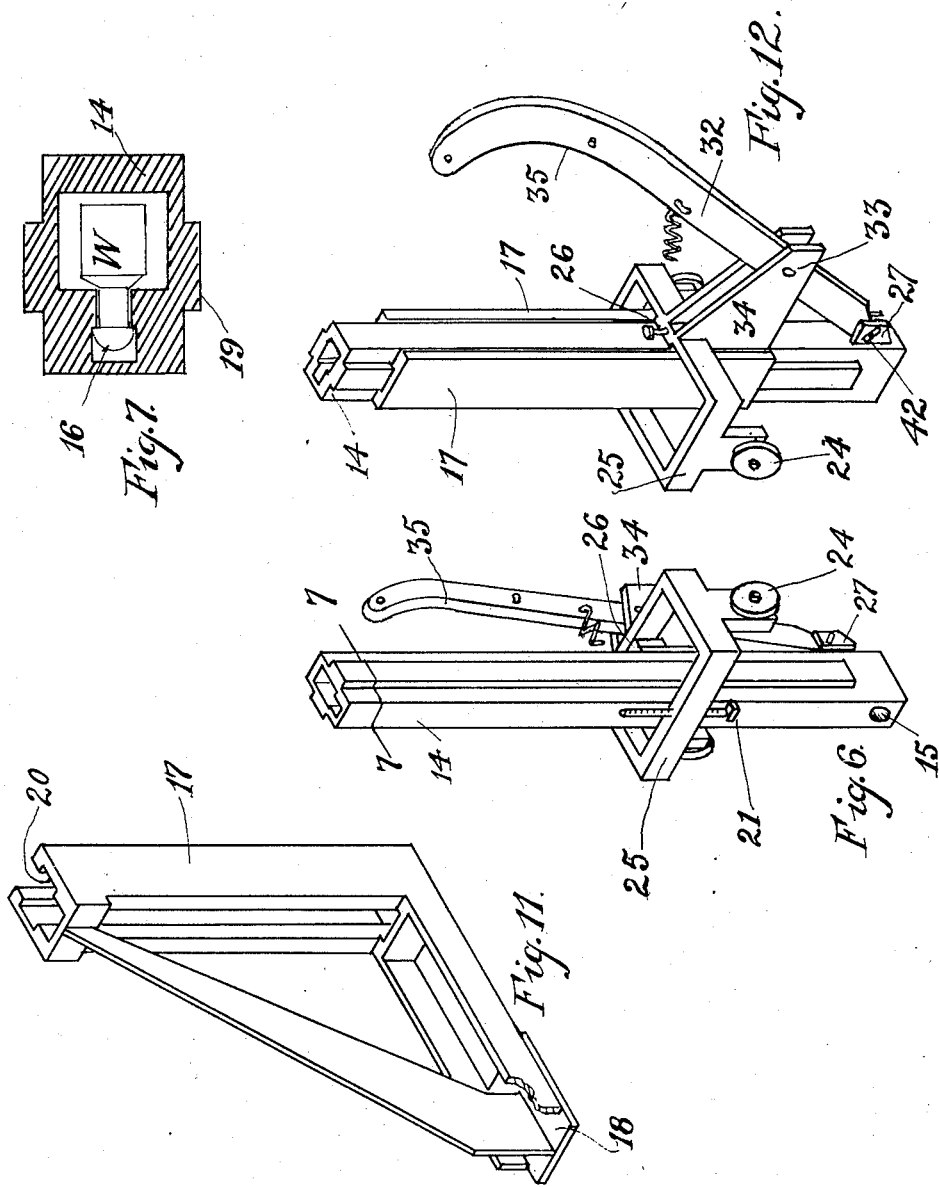

Nov. 7, 1944. W. A. TULLOCH 2,362,177
AUTOMATIC LOADING APPARATUS FOR MACHINE TOOLS
Filed April 10, 1944 4 Sheets-Sheet 4
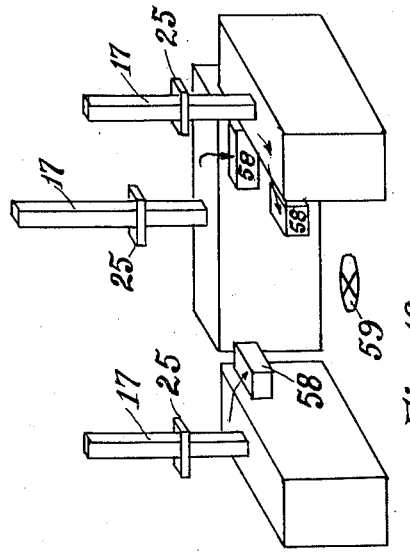
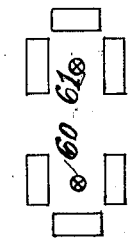
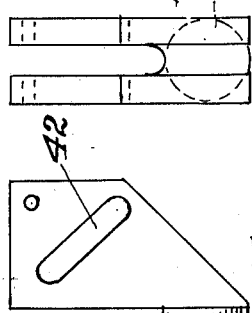
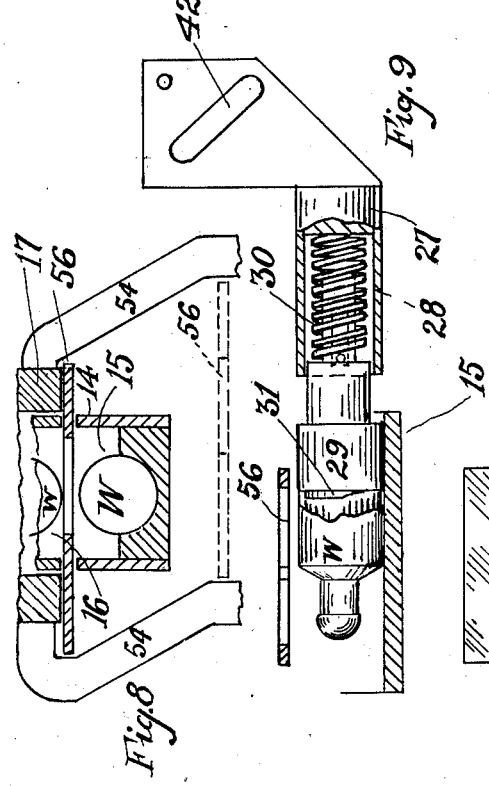
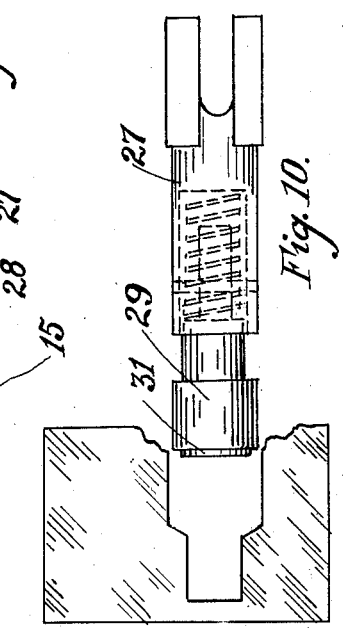
INVENTOR
WILLIAM A. TULLOCH.
BY
ATTORNEY Patented Nov. 7, 1944

2,362,177

UNITED STATES PATENT OFFICE 2,362,177

AUTOMATIC LOADING APPARATUS FOR MACHINE TOOLS

William A. Tulloch, Saginaw, Mich., assignor of one-half to George B. Willcox, Saginaw, Mich.

Application April 10, 1944, Serial No. 530,294

6 Claims. (Cl. 77—3)

This invention is an automatic loader for machine tools wherein a work-holding collet and a reciprocative tool carriage are associated for cooperative working in timed relation.

Its objects and advantages in use are, in general, as follows:

To overcome difficulties of loading such tools by hand; to provide an automatic loader that can be conveniently added to existing machine tools; to provide an automatic loader for continuously feeding parts into the machine chuck or collet while the machine is running through its work cycle at high speed and without a stop during long periods of duty; to provide mechanical means whereby the functions of the loader are positively synchronized with those of the machine tool slide and whereby the loader can be driven directly from the tool slide; to provide an ejector and loader that shall operate without any loss of time between successive tool movements, thereby greatly increasing the production rate; to provide for automatically inserting work pieces into the collet under conditions that simulate as nearly as possible the arm and hand movements of a skilled operator when inserting a work piece with his fingers and pushing it in with his thumb, there being no jolt or impact on the work, thereby insuring that every piece will be seated alike and so accurately that minute tolerances can be satisfied in the finished product.

The advantages of my invention over other prior art machines will be better understood from the following considerations:

Motion study of loading and discharging operations, as customarily performed by operators of such production tools, disclosed unnecessary movements of arms, fingers, and bodies; particularly twisting motions of the spinal regions, resulting in fatigue, loss of time, and mental strain aggravated by considerations of daily quota and the desire to keep up with other operators. That serious "bottleneck" has caused inadequate production in high speed machine tools, particularly those devoted to such services as boring, shaping, and finishing of small parts in mass production.

I overcame this difficulty by creating an automatic loader that can easily be applied to machine tools of the type referred to. It is especially well adapted to bring about substantial saving of labor while increasing the production rate of the machine. In other words, my invention enables machine tools to attain greatest production with least expenditure of mechanical power and human effort.

It provides synchronizations of the automatic loader with the machine tool carriage. Any modification of cycle or speed, such as may be introduced into the machine tool operations in order to accommodate differently shaped work pieces will be automatically adopted by the loading machine.

The loading mechanism itself need not be reorganized in order to modify its timing etc. to suit the tool carriage timing for the new work piece.

Another object of my invention is to provide means whereby every work piece is inserted into a chuck to the proper depth without rebound or back lash, so every piece can be accurately placed and held in the chuck to a machined tolerance of about one thousandth of an inch.

I have designed this automatic loader with working parts arranged so the machine tools to which it may be applied can be grouped conveniently in twos or threes around a station manned by a single operator, each machine delivering its finished product within easy reach of the operator, who gauges the pieces produced by each tool.

As an instance of what is meant by the increased production alluded to it may be observed that in commercial use a two-spindle machine is producing 240 pieces per hour when fed by hand by one operator; whereas a machine of the same type with only one spindle equipped with this automatic loader is producing, under like conditions, 300 pieces per hour. Therefore, a two-spindle machine thus equipped will produce 600 pieces per hour and a group of three two-spindle machines should produce in the neighborhood of 1800 per hour, with one operator.

These important production advantages are attained through the novel design, structure, and mode of operation of loaders according to my invention, as will now be described.

With the foregoing and certain other objects in view, which will appear later in the specifications, the invention is found in the novel construction, arrangement, and combination of means illustrated in the acompanying drawings, and particularly pointed out in the appended claims, it being understood, however, that the claims are not intended to be limited to the form of the parts illustrated and described further than a limitation to the described form is necessary to distinguish them from the prior art.

Referring to the several views of the drawings,

Fig. 1 is a side elevation, partly diagrammatic and partly in section, of a device embodying the invention and installed on the head stock and movable tool carriage of a machine tool. The section is taken in a vertical plane that includes the central axis of the work chuck and tail stock, the members being shown in position after having charged the work piece from the delivery chamber of the loader into the chuck;

Fig. 2 is an end elevation of the parts shown in Fig. 1 viewed in the direction of the arrow designated by the character V—2;

Figs. 3 and 4 are, respectively, side and end elevations of the loader shown in Figs. 1 and 2 as it appears when the tool is cutting the work;

Fig. 5 is a longitudinal sectional view of a typical work piece;

Fig. 6 is a perspective view of the reciprocating magazine and associated parts, in a preferred arrangement;

Fig. 7 is an enlarged cross-sectional view taken on line 7—7 of Fig. 6, showing the magazine as arranged for lengthwise movement and containing a typical work piece, with interior guideways for the work and exterior guideways for engagement in a housing such as shown in Fig. 11;

Fig. 8 is a detail view, partly in section, of a plate and guides for delivering work pieces singly from the magazine into the chamber;

Fig. 9 is an enlarged detail view, partly in section, showing a plunger for delivering work pieces from the chamber;

Fig. 9A is an end view of the parts shown in Fig. 9;

Fig. 10 is a top plan view of the means shown in Fig. 9;

Fig. 11 is a perspective view of a preferred housing to support and guide a longitudinally movable work piece magazine of the type shown in Figs. 1, 3, 6, and 12;

Fig. 12 is a perspective view showing the magazine mounted for up-and-down movement, the view being taken in the direction indicated generally by the arrow V—12, Fig. 1;

Fig. 13 is a diagrammatic view showing the relative positions of the work piece and collet jaws when the work starts into the collet against yielding resistance of an ejector spring;

Fig. 14 is a view similar to Fig. 13 but showing the work held by the collet against pressure of the ejector spring;

Fig. 15 is a similar view showing the collet released and the spring ejecting the work piece from the collet;

Fig. 16 is a diagrammatic perspective view showing three machines equipped with my invention grouped for use by one operator; and Fig. 17 is a diagram indicating how two groups of three machine tools may be arranged to be served by two operators, or by one, as circumstances may require.

The drawings illustrate a typical embodiment of the invention. It is characterized by structural simplicity, strength, endurance and ability to operate using solely the power required to run the machine tool, without any other source, and capable of utmost precision and accuracy through long working periods. All parts are easily accessible for inspection and are adjustable to adapt the loader to differently shaped work pieces within the capacity of the machine tool.

Like characters of reference indicate like parts in all figures of the drawings.

Referring now to Fig. 1, numeral 1 designates the head stock of a machine tool, in this case a boring machine, and 2 is the spindle having a work-holding chuck or collet 3. Opposed to the chuck is a cutting tool 4 mounted on tool support 5 which is carried by carriage 6.

The carriage is mounted on the usual ways (not shown) and is adapted to move back-and-forth toward and away from the collet 3, such being typical performance for boring machines.

For purposes of description a work piece W, Fig. 5, may comprise a cylindrical cup 7 with a cylindrical stem 8 projecting axially outward beyond the closed end wall of the cup and having a semi-cylindrical end knob 9.

Tool carriage 6 is shown, in Fig. 1, retracted to a position remote from the collet 3, that being the position it occupies whilst a work piece W is being pushed into the collet by the feeding-in plunger of my automatic loader.

To put the work piece W into the collet, carriage 6 that tool 4 are retracted as is shown in Fig. 1. After the work piece has been clamped in the collet, the tool 4 advances to the cutting position, which is shown in Fig. 3.

The cycle of tool carriage movements for the work piece W, Fig. 5, is indicated diagrammatically in both elevations, Fig. 1 and Fig. 3. The horizontal lines and arrows below those views show the length and direction of the travel of tool 4. For example, in Fig. 3 tool 4 has advanced at fast speed, in the direction of arrow 10, until it arrived at the entrance to cup part 7. At 11 the tool 4 shifts to slow speed and commences to bore to the end 12 of its travel, which is at the closed end wall, 7a, Fig. 5. There the tool halts and dwells while making a cut across the face of the end wall. At the termination of dwell the carriage and tool retract at fast speed in the direction of arrow 13 and upon arriving at their initial position suddenly halt, having now completed a typical cycle of movement.

In the standard processing of work W the chuck 3, Fig. 3, is usually opened and closed by hydraulic pressure and its functions are coordinated and synchronized with the appropriate functions of carriage 6 and tool 4.

The above explanation will in a general way suffice to set forth the typical structure and mode of operation of known machine tools to which my automatic loading and unloading machine may be applied.

Numeral 14 designates a supply magazine for work pieces to be delivered to a chamber 15.

In the drawings I have shown the supply magazine as an upright tube to take work pieces, as in a cartridge clip, and the work pieces feed downwardly by gravity through a passage 16 into chamber 15. Magazine 14 need not necessarily be vertical. The requirement is that chamber 15 shall be in communication with a supply magazine and that locating and actuating means shall be provided for the chamber to transfer it from the position shown in Fig. 1 to that of Fig. 3.

Chamber 15 reciprocates between positions shown in Figs. 1 and 3.

In the embodiment shown, the magazine slides lengthwise in a housing 17 which is part of a bracket, Fig. 11, that may be secured by its base 18 to head stock 1 of the machine tool.

Guideways 19 and 20 are provided on magazine 14 and in housing 17 respectively. An adjustable abutment member 21 serves to momentarily establish chamber 15, and the work piece contained therein, in coaxial alinement with collet 3; that being the position in which chamber 15 discharges the work piece W into the collet.

The guideways and abutment constitute a locating means for the chamber.

Actuating means for the locator comprise an oblique cam 22 with a horizontal upper portion 23, and a runner, such as roller 24, in alinement therewith, the runner being united to the work piece chamber 15 by a frame 25, detailed in Figs. 6 and 12. Frame 25 is fixed to magazine 14 at 26 and so is united to the movable chamber 15 and travels with it.

In the chamber 15 is a work piece impeller the purpose of which is to push the work piece with cushion-like impulse out from the chamber when the chamber has been established in co-axially alined relation with the collet 3, as has been described.

The impeller, shown in Figs. 9, 9A, and 10, consists of a plunger 27 loosely received in the chamber 15 as shown in Fig. 1.

The plunger body is hollow at 28 and a ram head 29, backed by a compression spring 30, is slidingly received in the plunger body. At the front end of the head 29 is a projection 31 that serves to support and steady the back end of the work piece W while it is being pushed from the chamber 15 into the collet 3 in the manner shown diagrammatically in Figs. 13, 14, 15.

The cooperating members of the collet 3 will be described later.

Means for actuating the impeller that drives the work piece out of the chamber 15 comprises an arrangement of a lever, a cam, and a toggle action trolley that together provides mechanical connection from the reciprocative tool carriage 6 to the plunger 27 in the work piece chamber 15. Such actuating assembly for impelling the work piece into the collet is powered from the horizontal movement of the tool carriage, and, as has been set forth, the movement of the chamber 15 and plunger 27 toward and away from the axis of the collet is also powered from the tool carriage 6 through the oblique cam 22 and the runner 24.

It is a function of the lever and trolley and their associated parts to impart to ram head 29 its ability to insert the work into the collet as nearly as possible like the action of an operator's arm and fingers and thumb in the hand-operation of pushing work W into the collet and holding it there until the collet has seized it. Consequently it is a function of the lever, trolley, and toggle arrangement to cause the plunger 27 when remote from the machine axis, as shown in Fig. 3, to be clear of the chamber 15 so as to receive a work piece into the chamber from the magazine 14.

The tool carriage retracts to the right, Fig. 3, along the line 13, at fast speed and then returns to its original position along the line 10, first at fast speed toward 11, where the tool commences to cut the work, and terminating at 12, where there is a dwell while the tool faces off the end wall 7A of the work piece, then starts back on the return stroke 13.

The several timing functions of the lever, trolley and toggle assembly and the structural features thereof will now be described.

Starting with Fig. 3, and referring also to Fig. 1, it will be observed that, in Fig. 3, the chamber 15 and plunger 27 are remote from the machine axis. A work piece is clamped in the collet 3, and tool 4, support 5, and carriage 6 are all in position to start the cut in the bore of the cup 7. Plunger 27 is seen to be retracted from chamber 12, which at this time contains a second work piece (not shown).

Lever 32 is a bar which is pivoted at 33, intermediate its ends. The pivot 33 is carried on a unitary part 34 of chamber 15, since it is connected to chamber 15 by being fixed, as by welding, at 26, Fig. 12, to the wall of magazine 14.

Magazine 14, frame 25, runners 24, part 34, and lever 32 and abutment stop 21 all travel up-and-down as a unit in the housing 17.

Referring now to Fig. 3, the cam 22 during the fast return stroke of the tool carriage along line 13 will lower the magazine 14, chamber 15 and its associated parts from the raised position, Fig. 3, to the lower axially alined position for charging the work into the collet, Fig. 1.

During the return stroke, 10, carriage 6 causes cam 22 to raise the parts shown in Figs. 6 and 12, including chamber 15, to their initial elevated position, Fig. 3.

During the operation of the machine the lever assembly operates to push the work piece into the collet 3 with a cushion effect like the ball of a person's thumb, thereby seating the work in the collet firmly and without jar, rebound or vibration, and placing it so accurately that the depth 7A of the bore in cup 7 will always be within a tolerance of, say, one-thousandth of an inch. Moreover, a final thrust of the ram head 29 gives a sudden and powerful impulse against the work piece. This final impulse is produced by snap action of lever 32 and is effected by a cam 35 on the end of lever 32 remote from the plunger 27. This action is one of the important functions of the timing device, because it compels the cushioned plunger to completely drive home the work piece in the collet without any danger of breaking or straining the automatic loader.

Referring now to Figs. 13, 14, 15, collet 3 has a spring-actuated work piece expeller, comprising a slidable rod 36 contained axially in the collet and normally urged outwardly by a compression spring 38, Figs. 1 and 14, that takes against a collar 37 fixed on the rod. The other end of spring 38 abuts against an end wall 39, Fig. 1, in spindle 2. The work-engaging end of rod 36 projects through a central hole in a spider 40, fixed within the spindle 2. A cup 41 in spider 40 receives the advancing end of knob 9 and seats it precisely, see Fig. 14.

Cushioning spring 38 on rod 36 is strong enough to exert considerable force say, about 16 pounds, tending to keep rod 36 normally projected through the central cup 41, and also enabling it to expel the finished work from the collet.

In plunger 27, Fig. 9, the cushioning spring 30 exerts considerably greater force than the spring 38 in the spindle, say, about 25 pounds, hence can push the work into the collet against resistance of the weaker spring 38.

The advancing work piece is thus held firmly between ram head 29 and rod 36, Fig. 13, preventing any displacement of W while it is being pushed into the collet.

Accidental displacement of W is avoided also by a final whip-like snap action of the lever 32.

Immediately the work has been pressed home by such action, the collet jaws close and grip the work, being operated by the hydraulic control system whose timing is regulated from the tool carriage 6.

When W has been siezed by collet 3, plunger 27 is drawn out from chamber 15 and both move quickly to a place remote from the axis, as shown in Fig. 3, thereby making room for tool 4 to advance as indicated by arrow 10 and engage the work and perform its boring and facing, at 7, 7a, respectively, Fig. 5.

The arrangement and mode of operation of lever 32 and its associated parts will be understood by referring first to Fig. 1. Lever 32 is there shown at the right-hand limit of its movement. Tool 4 and its carriage 6 are also at the right-hand limit of their travel. The final impelling snap-action, above alluded to, has been exerted by lever 32 upon plunger 27.

The means by which lever 32 accomplishes such snap action is as follows:

Referring to Fig. 12, the lever has its lower end secured, by jointed connection 42, to impeller plunger 27. The other end of the lever, remote from the impeller presents a cam face 35 concave toward the magazine 14.

A runner 43, Figs. 1 and 2, mounted on a trolley frame 44, is movable along the length of the cam face 35. At 49 on the trolley frame is hinged an adjustable extensible rod 45, the lower end being pivoted at 46 to the tool carriage 6 or preferably to a suitable support 47 fixed to the carriage 6. Support 47 also carries the oblique cam 22 and its horizontal track portion 23. Members 47, 46, 23 and 22 all travel forward and back with the carriage 6 and tool 4, as indicated by arrows 10 and 13.

In Fig. 3, carriage 6 moves to the left. Normally the trolley frame 44 tends to rest freely on a limit pin 48 on lever 32. The trolley frame serves as one arm of a toggle, the other arm being rod 45, hinged at 49.

In position as shown in Fig. 3, lever 32 and the rod 45 are approximately vertical and parallel, the toggle being situated so that the tool carriage 6 shall move about nine-tenths of its travel toward the right, as indicated by arrow 13, while the lever 32 allows plunger 27 to remain outside the chamber 15, and the chamber is moving into alinement with the axis of the collet, as shown in Fig. 1. Meanwhile, a light tension spring 50, connecting lever 32 with member 25 on magazine 14 is sufficient to keep lever 32 upright.

During approximately the last tenth of tool-travel, 13, Fig. 1, the trolley suddenly goes into action on plunger 27, to drive the work W out from the chamber 15 into collet 3. The action in general is as follows: Runner 43 remains near limit pin 48 until about the last tenth of the travel.

Referring now to Fig. 1, the angular linkage, rod 45 and trolley frame 44, have pulled the lever promptly and positively toward the right. Runner 43 moved up along the curved cam face 35 in the direction of the arrow and when the runner approached the middle of the cam curve, almost at the last instant of carriage travel, the runner 43 snapped upwardly to the position indicated by dotted arc 43a and came back again. Its whip-action travel from 43 to 43a was on the reversely-directed curve 35a of cam 35. Momentum of runner 43 caused lever 32 to make a sudden sharp push to the left against plunger 27 in chamber 15, giving suddenly added compression to spring 30, a cushion effect on ram head 29 and driving work W tightly to its seat 41 in collet 3.

At the commencement of the return swing of lever 32, like tool stroke 10, Fig. 1, a runner 51 takes against a rearward cam face 52 and shoves lever 32 to the left into its initial upright position, Fig. 3, thereby withdrawing the plunger 27 from the chamber 15. A new piece W then passes from magazine 14 into chamber 15.

Numeral 53 designates a tension spring that yieldingly holds trolley 44 and adjustable rod 45 in angular position and prevents toggle members 44 and 45 from straightening out.

Adjustable rod 45 is provided with a turnbuckle to change the length of the rod, the purpose being to time the actions of arm 32 so as to properly coordinate movements of chamber 15 and plunger 27 on the one hand and movements of the cutting tool 4 on the other. Also, adjustment of rod 45 assists in adapting the automatic loader to work pieces of different shapes requiring different timing of the chamber and of work piece impeller or plunger 27.

Some of the more specific features of the automatic loader will now be set forth.

To feed work pieces from the magazine 14 into chamber 15 they may drop down by gravity; but where more positive operation is needed an automatic feeding means is provided, see Fig. 8.

The housing 17 of magazine 14 is provided with two downwardly projecting oblique guide members 54, 54. A slidable feed plate 56 extends across the passageway 16 that leads from the magazine to the chamber. Plate 56 has an opening through which the work pieces can drop if the plate opening is central with the magazine. But when the magazine and chamber are down to the bottom of their travel the feed plate 56 is in the off-center position shown by dotted lines and the next work piece is prevented from passing from the magazine 14 into chamber 15. Guides 54, 54 shift the plate 56 automatically from left to right when the magazine moves down, Fig. 8, along the oblique guides 54, 54.

Collet rod 36, in addition to its tendency to oppose the push of the work piece W when entering the collet, also functions as an expeller, driving the finished work piece from the collet 3 as shown, as the conventional hydraulic control devices release their grasp on the collet jaws. Rod 36 shoots the work W out from the collet by the force of spring 38.

To prevent the expelled work piece being shot from the collet, hitting and perhaps injuring the tool 4, a shield 57 of sheet metal extends downwardly like a screen, Figs. 1 and 3. Expelled pieces W, upon striking the shield, are guided in the direction of the arrows, Fig. 16, into a receptacle 58.

Fig. 16 shows how three machine tools equipped with my automatic loaders, indicated by numerals 17 and 25, may be grouped around an operative's station 59, thus enabling a single operative to tend all three machines.

In Fig. 17 six such machines are similarly grouped around two operative's stations 60, 61. With this arrangement one person can operate all six, or two operatives may divide the work when it is of such nature that the cycle of operations requires a longer time for its completion.

In practice, a machine tool equipped with the automatic loader and set up to bore and face off the cylindrical cup, Fig. 5, usually makes one complete cycle of operations in about 12 seconds, as follows:

Assuming the plunger starting into chamber 15 when in the coaxial position, it drives the work piece into the chuck and withdraws from the chamber in 2 seconds. The plunger being retracted from the chamber, it goes to the remote position shown in Fig. 3, receives another work piece and comes down to the coaxial position in 10 seconds, thus completing the cycle of the plunger in 12 seconds.

Tool 4 likewise makes its cycle in 12 seconds, as follows:

Starting from its position, Fig. 1, the tool moves toward the collet, as per arrow 10, and arrives at the entrance to the work piece in 3 seconds. It dwells 1 second before starting a cut in the bore of cup 7; requires 3 seconds for boring and 2 seconds for facing the interior end wall 7a. Tool 4 then backs out from the work piece and returns, as indicated by arrow 13, in 3 seconds, making its cycle in 12 seconds.

Collet 3 releases the work piece about 2 seconds after the tool has started backing out. When the collet opens, the ejector rod instantly kicks the work piece out of the machine.

It is a feature of my invention that the loader loses no time between cycles, so that with a 12-second cycle 300 pieces per hour are fabricated at each machine tool spindle and the group of three machines with two spindles each, as arranged in Fig. 16, will have a producing capacity of approximately 1800 pieces per hour with one operative, as has been stated above.

Having thus described my invention, what I claim and desire to secure by Letters Patent is:

1. An automatic loading apparatus for a machine tool having a collet and a reciprocative tool carriage, a supply magazine for work pieces; a movable work-piece chamber communicating with the magazine and arranged to deliver automatically one work-piece at a time from the magazine into the chamber; means actuated by the tool carriage and operatively connected to the chamber for shifting the chamber by turns from coaxial alinement with said collet to a place remote from such alinement; said shifting means comprising a cam and a cooperative runner, one being fixed in relation to the chamber and movable therewith, the other being fixed to and movable with the tool carriage; a work-piece impeller operative within the chamber and comprising a cushioned portion adapted to engage and move the work-piece out from the chamber and into the collet; actuating means for said impeller, comprising an oscillatory lever movable as a whole with the chamber; said lever having one end jointed to the impeller and having at a place intermediate its ends pivotal connection to a part fixed in relation to the chamber; the end portion of the lever remote from the impeller presenting two cam faces; a trolley freely movable lengthwise of the cam faces; said trolley comprising a frame and a runner mounted thereon for engaging one of said cam faces independently of the other; means for oscillating the lever, comprising a connecting rod having an end pivotally secured to said reciprocative tool carriage, the other end hinged to the trolley frame; means for adjustably varying the length of said connecting rod; spring means for yieldingly keeping the trolley and connecting rod in angular position relatively to each other; a slidable rod mounted axially in the collet and normally spring-pressed outwardly therefrom with less force than the force exerted by the aforesaid cushioned portion of the work-piece impeller in the chamber.

2. An automatic loader for machine tools wherein a work-holding collet and a reciprocative tool carriage are associated cooperatively for working in timed relation; said loader comprising a movable magazine for containing work-pieces; a work piece chamber at an end of the magazine; means for delivering work-pieces singly from the magazine into the chamber comprising a slidable apertured feed plate and stationary oblique guide members therefor; actuating and guiding means for the magazine and chamber arranged to transport a work piece while contained in the chamber, into coaxial alinement with said collet and to retract from such alinement and clear the tool carriage mechanism when the tool is in position for cutting; said means comprising an oblique-faced cam traveling with the tool carriage and a runner fixed to and movable with the magazine and situated in the path of travel of said cam; a plunger slidable endwise in said chamber and secured by jointed connection to an arm of a lever pivoted intermediate its ends to the magazine; another arm of said lever remote from the plunger presenting two curved cam faces, one being concave toward the magazine, the other spaced therefrom and substantially parallel therewith; a trolley having a frame movable along the length of said cams and having runners for engaging each cam face independently; said trolley being pivotatlly joined togglewise to one end of an extensible connecting rod whose other end is hinged to a part of said tool carriage.

3. In an automatic loading apparatus for a machine having a collet and a reciprocative tool carriage; a supply magazine for work-pieces; a movable chamber in communication with the magazine arranged to deliver a work-piece at a time from the magazine into the chamber; means for changing the location of the chamber, by turns, from coaxial alinement with the collet to another place remote from such alinement; said means comprising cam devices actuated by the reciprocative tool carriage and adapted for operative engagement with the chamber; a work-piece impeller operative within the chamber to move the work-piece from the chamber into the collet; actuating means for said work-piece impeller comprising an oscillatory lever mounted to travel as a whole with the chamber; said lever being pivoted at a place intermediate its ends to a member unitary with the chamber; an oscillatory end portion of the lever remote from the impeller having operative connections with the reciprocative tool carriage; said connections comprising a trolley movable freely along the end portion of the lever and having a runner on the trolley for engaging a face of the lever; a connecting rod pivoted at one end to the trolley frame and at the other end to the reciprocative tool carriage; the said connections between the oscillatory end of the lever and the trolley including cam-action means adapted to cause the tool-carriage movements to produce appropriately synchronized movements of the work-piece impeller irrespective of any changes in location of the shiftable chamber.

4. Mechanism for charging work pieces into the collet of a machine tool by action of a reciprocative tool carriage, comprising a shiftable work-piece chamber; means for supplying the chamber with work-pieces one at a time; ejector means associated with the chamber for delivering work-pieces therefrom in the direction of their length, said ejector means being mounted in fixed relation to the chamber and shiftable as a unit therewith; a chamber locator adapted to guide the chamber and its associated ejector to a location where the work-piece in the chamber is coaxial with the collet and, by turns, to retract the same from such coaxial location to a location remote therefrom; locator-actuating means operatively connecting the tool carriage with the locator and adapted to move the chamber into said coaxial position when the tool carriage is retracted from the collet and to move the chamber away from such coaxial position when the carriage advances toward the collet; actuating mechanism operatively connecting the said ejector means to the reciprocative tool carriage, such connecting mechanism including an oscillatory lever jointed at one end to the ejector means and shiftable with the chamber; a cam on the oscillating end of said lever; a trolley freely movable lengthwise of the cam and comprising one member of a toggle, the other member being pivotally secured to said reciprocative tool carriage; said cam, trolley, and toggle being arranged as an assembly adapted to coordinate the shifting movements of the work-piece chamber and the reciprocating movements of the tool carriage in accurately timed and synchronized relationship to each other.

5. Mechanism for charging work pieces into the collet of a machine tool by the action of a reciprocative tool carriage; said mechanism comprising a chamber shiftable into coaxial alinement with the collet and into a location remote from such alinement; means for supplying the chamber with work pieces at such remote location; means actuated by the tool carriage and operatively connected to the chamber for shifting and guiding the chamber in synchronized relation with the movements of the tool carriage; a work-piece ejector device associated with the chamber; means to coordinate the movements of the ejector device with the movements of the tool carriage in synchronized relationship, said means comprising an oscillatory lever jointed at one end to the ejector device and being pivoted intermediate its ends to a member which is shiftable as a unit with the chamber; a cam on said lever; a trolley movable freely lengthwise of said cam and serving as a member of a toggle; another toggle member pivotally connecting said trolley to said reciprocative tool carriage; the aforesaid cam presenting a curved face; a runner mounted on the trolley for engagement with said face; said runner adapted to impart whip-like snap action to said lever when the tool carriage is near the end of its reciprocative travel remote from the collet.

6. In automatic loading apparatus for machine tools having a collet and reciprocative tool carriage, a supply magazine for work-pieces; a housing having guideways slidingly receiving said magazine and mounted on a fixed support; the lower end of the magazine having a chamber with a longitudinally movable plunger therein, said plunger having a ram head backed by a compression spring; a lever pivoted intermediate its ends to a unitary part of said magazine and pivoted at its lower end to said plunger, a cam on the end of the lever remote from the plunger, spring means yieldingly urging the lever toward the magazine; a frame fixed to the magazine and surrounding the housing; a runner mounted on said frame outside of the housing, an adjustable abutment member secured to the frame and adapted to engage a part of the housing to limit the downward movement of the machine tool, an oblique cam and a horizontal track portion carried by the said support and adapted to engage the said runner for elevating or lowering the housing, chamber, and lever in the advancing and retracting movements of the tool carriage respectively; a trolley frame movable along the length of the cam on the said lever, said trolley frame carrying a runner engaging the cam face of the lever and being hinged at its end remote from the runner to an adjustable extensible rod, the lower end of said rod being pivoted to said support on the tool carriage; the said trolley and rod members being connected by a spring for holding said two members in toggle-joint relationship.

WILLIAM A. TULLOCH.